June 29, 1965   E. L. MYERS   3,191,438
THERMOMETERS
Filed Dec. 18, 1961
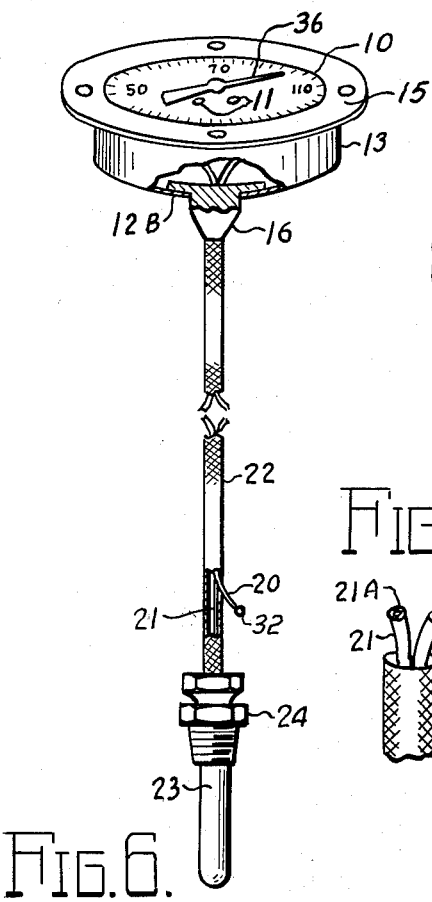
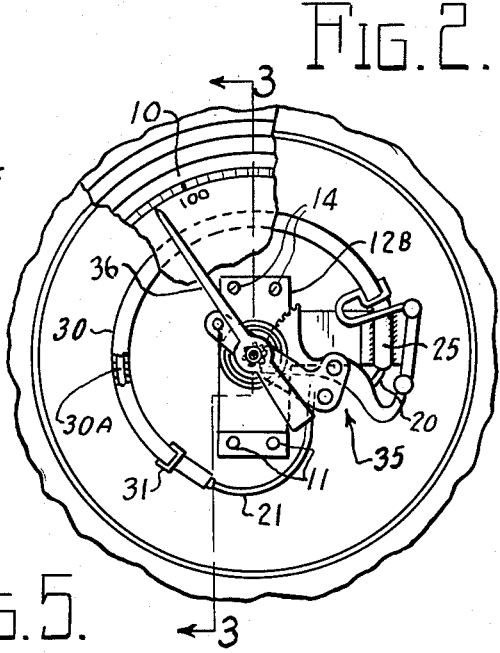
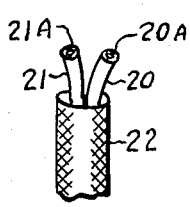
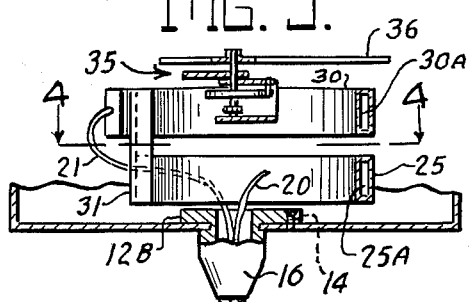
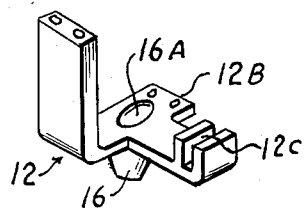
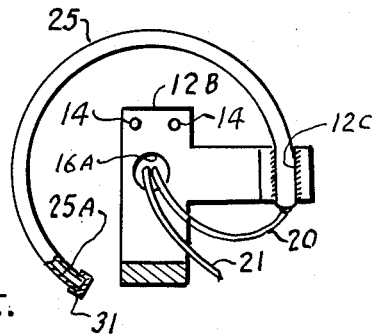
INVENTOR.
Errol L. Myers
BY
ATTORNEYS

3,191,438
THERMOMETERS
Errol L. Myers, Novi Township, Novi, Mich., assignor to Howard O. Trerice, Detroit, Mich.
Filed Dec. 18, 1961, Ser. No. 159,918
1 Claim. (Cl. 73—368.6)

My invention relates to thermometers and more particularly to compensated fluid expansion actuated dial thermometers utilizing Bourdon tubes in which arcuate portions thereof move by thermal forces effecting changes of volume therein.

In thermometer systems such as the liquid filled Bourdon tube type adapted for remotely sensing temperatures from a sensing bulb through a length of flexible Bourdon tube, problems of maintaining accuracy are encountered when the flexible tube is itself subjected to uncontrollable temperature changes. These changes produce thermal expansions and contractions which upset the accuracy of the indicated bulb temperatures.

Heretofore this has been overcome by the provision of a second system exposed to the same thermal environment but having no bulb and operatively connected with the first system through some type of differential mechanism in such a way that indicator motion produced by volume changes in the second system acts to counteract or compensate for indicator motion produced by volume changes in the first system exclusive only of the temperature sensing bulb.

In manufacturing such thermometers, both of the systems involved must be separately calibrated. Thus, not only do such devices include rather complex mechanisms, but the calibration involved is an expensive and time consuming process.

An object of the present invention is to simplify Bourdon tube thermometers by providing an uncalibrated compensating system connected directly to the calibrated sensing system and dependent for accuracy on the substantially uniform volumes of the Bourdon tube elements utilized.

Another object of the invention is to facilitate the manufacture and maintenance of Bourdon tube thermometers by providing a simplified compensating system in parallel relation to the main sensing system in which the actuated parts are secured directly to each other.

For a more complete understanding of the invention, reference may be had to the accompanying drawing illustrating a preferred embodiment of the invention in which like reference characters refer to like parts throughout the several views and in which FIG. 1 is a perspective view, partially in section, of a preferred thermometer system embodying the present invention.

FIG. 2 is a top view of the thermometer with the dial portion partially removed for clarity.

FIG. 3 is a cross-sectional view taken substantially on the line 3—3 of FIG. 2.

FIG. 4 is a cross-sectional view taken substantially on the line 4—4 of FIG. 3, and FIG. 5 is a fragmentary detail of a portion of tube-carrying braided cable used in the system.

FIG. 6 is a perspective view of a bracket used in the present thermometer.

As illustrated, the present system comprises a dial thermometer gauge 10 calibrated in degrees and mounted by means of screws 11 or the like to the top of a support bracket 12, illustrated in FIG. 6. A casing 13 is secured on the base 12B of the bracket 12 by screws 14 or the like and has a flange 15 adapted for flush mounting in a convenient location, as for example in panel. If desired, the case may be supplied with a similar flange on the back of the case to facilitate surface mounting.

The base 12B of the bracket 12 has a fitting 16 provided with a central bore 16A and extending through the back of the casing 13. Bottom outlet brackets may also be utilized.

A pair of flexible Bourdon capillary tubes 20 and 21, sheathed in a braided flexible armor 22 or the like have their ends extending through the bore 16A into the inside of the casing. The tubes 20 and 21 have substantially uniformly sized bores 20A and 21A.

The other end of the tube 21 is connected with a temperature sensing bulb 23 provided with a fitting 24 adapted for mounting in any suitable location remote from the gauge 10.

A C-shaped, flat, spring-like Bourdon tube 25 provided with a capillary cavity 25A is secured at one end, preferably with solder, in a slot 12C provided on the bracket 12 and extends arcuately substantially concentric with the bore 16A which is preferably axially aligned with the gauge 10. One end, preferably the secured end, of the tube 25 is communicatingly connected with the other end of the tube 20. The tubes 20 and 25 are filled with a liquid medium, and the tube 20 is closed as by a piece of solder 32 so that it is, in effect, a dummy.

A second floating C-shaped, flat, spring-like Bourdon tube 30 is provided, being mounted and carried near one end directly on the free end of the tube 25 by a post 31 or the like. The tube 30 has a capillary cavity 30A and the end of the tube 21 is communicatingly connected preferably to the mounted end of the tube 30. The tube 30 is preferably disposed on a common axis and has substantially the same radius as the tube 25, and the tube 21 extends adjacent the tube 20 in the sheath 22 to a bulb 23. The tubes 21 and 30 and the bulb 23 are filled with a liquid medium.

The free end of the floating tube 30 is operatively connected by linkages and gears indicated generally at 35 with an indicator pointer 36 adapted to sweep over the dial 10.

Thus, temperature changes at the bulb end 23 are transmitted in the form of total volume variations to the tube 30, and the consequent forces tend to increase and decrease the radius of the arcuately disposed tube 30, which, with one end fixed to the lower tube 25, produce motion of the other end. This motion is transmitted to the linkage 35 and thence to the indicator pointer.

Since the tubes 21 and 30 are disposed in areas which might also be subject to temperature changes, the total volume changes in the bore 21A and cavity 30A would, without more, upset the accuracy of the system.

It will be apparent that the temperature changes affecting the tubes 21 and 30 will be counteracted and compensated by the same changes affecting the dummy system tubes 20 and 25 with the motion produced by the free end of the tube 25 due to temperature variations being equal and in a direction opposite to the motion of the free end of the tube 30 produced by temperature changes of the tubes 21 and 30 but not of the bulb 23. Thus the ultimate movement of the indicator pointer 36 will be proportional only to the temperature changes of the bulb 23 environment.

In actual practice, with dependence solely on the uniformity of capillaries rather than on complex calibration of a compensating system, accuracy is maintained with a maximum error of plus or minus 0.5° F., over most standard operating temperature ranges, which is sufficient for most commercial purposes.

Although I have described only one preferred embodiment of the invention, it will be apparent to one skilled in the art to which the invention pertains that various changes and modifications may be made therein without departing from the spirit of the invention or the scope of the appended claim.

I claim:

A compensated thermometer comprising (a) a support,
(b) a graduated scale carried by said support,
(c) a first Bourdon spring and means securing said first Bourdon spring to said support,
(d) a second Bourdon spring and means securing said second Bourdon spring to said first Bourdon spring,
(e) said Bourdon springs each being arcuately constructed and each being substantially C shaped to form a pair of spaced ends, said Bourdon springs further being disposed on a substantially common axis with said second Bourdon spring overlying said first Bourdon spring and with the ends of said second Bourdon spring overlying the corresponding ends of said first Bourdon spring,
(f) said first mentioned securing means comprising a bracket member fixing one end of said first Bourdon spring to said support,
(g) said second mentioned securing means comprising means fixing the opposite end of said first Bourdon spring to the end of said second Bourdon spring overlying same,
(h) a pointer element associated with said scale and link members connecting the opposite end of said second Bourdon spring wtih said pointer element and operable to move said pointer element over said dial in response to changes in the position of the end of said second Bourdon spring connected with said link members,
(i) a first capillary tube having one end connected to the end of asid second Bourdon spring which is fixed to said first Bourdon spring,
(j) a second capillary tube having one end connected to the end of said first Bourdon tube which is fixed to said support,
(k) a temperature sensing fluid filled bulb communicating with said first capillary tube and second Bourdon spring,
(l) each of said capillary tubes and Bourdon springs being at least partially filled with a temperature sensing fluid, and
(m) said first capillary tube extending closely adjacent said second capillary tube but terminating short of the end thereof.

References Cited by the Examiner

UNITED STATES PATENTS

| | | | |
|---|---|---|---|
| 636,884 | 11/99 | Atwood | 73—411 |
| 1,724,520 | 8/29 | Schlaich | 73—411 X |
| 2,274,479 | 2/42 | Inderdohnen | 73—412 X |
| 2,333,793 | 11/43 | Johnson | 73—411 |
| 2,841,985 | 7/58 | Haigler | 73—368.6 X |

ISAAC LISANN, *Primary Examiner.*

L. R. PRINCE, *Examiner.*